United States Patent
Leonhard et al.

(10) Patent No.: US 8,632,358 B2
(45) Date of Patent: Jan. 21, 2014

(54) CONNECTION DEVICE FOR A SOLAR MODULE

(75) Inventors: Andreas Leonhard, Darmstadt (DE); Bernd Kosch, Bensheim (DE); Kristopher Salzmann, Rossdorf (DE)

(73) Assignee: Tyco Electronics Amp GmbH, Bensheim (DE)

( * ) Notice: Subject to any disclaimer, the term of this patent is extended or adjusted under 35 U.S.C. 154(b) by 0 days.

(21) Appl. No.: 13/492,091

(22) Filed: Jun. 8, 2012

(65) Prior Publication Data

US 2012/0270450 A1 Oct. 25, 2012

Related U.S. Application Data

(63) Continuation of application No. PCT/EP2011/053069, filed on Mar. 2, 2011.

(30) Foreign Application Priority Data

Mar. 4, 2010 (DE) .......................... 10 2010 002 565

(51) Int. Cl.
*H01R 13/60* (2006.01)

(52) U.S. Cl.
USPC ............................ 439/528; 439/501; 439/148

(58) Field of Classification Search
USPC ................. 439/528, 501, 172, 709, 712, 713, 439/715–719, 502, 505
See application file for complete search history.

(56) References Cited

U.S. PATENT DOCUMENTS

| | | | | |
|---|---|---|---|---|
| 3,585,570 | A | * | 6/1971 | Jans ............................. 439/439 |
| 4,354,727 | A | * | 10/1982 | Brown ......................... 439/787 |
| 4,545,638 | A | * | 10/1985 | Neidich ....................... 439/787 |
| 4,647,735 | A | * | 3/1987 | Sicher ......................... 200/43.08 |
| 4,921,444 | A | * | 5/1990 | Cama ........................... 439/528 |
| 5,507,667 | A | * | 4/1996 | Hahn et al. .................... 439/501 |
| 5,630,728 | A | * | 5/1997 | Watters, Jr. .................... 439/528 |
| 5,700,158 | A | * | 12/1997 | Neiser et al. ................... 439/501 |
| 5,720,628 | A | * | 2/1998 | Usui et al. ..................... 439/502 |

(Continued)

FOREIGN PATENT DOCUMENTS

| | | | |
|---|---|---|---|
| DE | 102007027861 A1 | 4/2008 | |
| DE | 102007023210 B3 | 9/2008 | |
| DE | 102007060023 A1 | 6/2009 | |
| DE | 102008003448 | * 7/2009 | ............... H02G 3/16 |

OTHER PUBLICATIONS

PCT International Search Report and Written Opinion dated Mar. 22, 2012, issued in co-pending International Application No. PCT/EP2011/053069, 9 pages.

(Continued)

*Primary Examiner* — Ross Gushi

(74) *Attorney, Agent, or Firm* — Barley Snyder

(57) ABSTRACT

The invention relates to a connection device (100, 101, 102, 103) for a solar module (400), the connection device (100, 101, 102, 103) having a housing (110, 111, 112, 113) and a contacting means (180), arranged in the housing (110, 111, 112, 113), for contacting a contact element (430) of the solar module (400). The connection device (100, 101, 102, 103) is distinguished by a blind mating connector (120, 150) arranged on the housing (110, 111, 112, 113) without an electrical connection to the contacting means (180), onto which connector a plug-and-socket connector (220, 250) can be plugged. The invention furthermore relates to a solar module with such a connection device (100, 101, 102, 103).

21 Claims, 11 Drawing Sheets

(56) References Cited

U.S. PATENT DOCUMENTS

| | | | |
|---|---|---|---|
| 5,775,943 A * | 7/1998 | McElhone | 439/528 |
| 5,964,617 A * | 10/1999 | Hoang et al. | 439/528 |
| 6,074,241 A * | 6/2000 | Patel et al. | 439/441 |
| 6,352,447 B1 | 3/2002 | Ruth | 439/540.1 |
| 6,354,846 B1 * | 3/2002 | Murakami | 439/76.2 |
| 6,428,348 B1 * | 8/2002 | Bean | 439/501 |
| 6,537,105 B2 * | 3/2003 | Higashida et al. | 439/528 |
| 6,655,987 B2 * | 12/2003 | Higashikozono et al. | 439/535 |
| 6,746,272 B2 * | 6/2004 | Bean | 439/501 |
| 6,780,047 B1 * | 8/2004 | Laity et al. | 439/501 |
| 6,848,937 B1 * | 2/2005 | Hsiao | 439/528 |
| 6,909,046 B2 * | 6/2005 | Laity et al. | 174/50 |
| 7,004,781 B2 * | 2/2006 | Walter | 439/441 |
| 7,121,877 B2 * | 10/2006 | Lin | 439/502 |
| 7,134,883 B2 * | 11/2006 | Werner et al. | 439/76.1 |
| 7,175,469 B1 * | 2/2007 | Daily et al. | 439/441 |
| 7,291,036 B1 * | 11/2007 | Daily et al. | 439/487 |
| 7,365,965 B2 * | 4/2008 | Higashikozono et al. | 361/641 |
| 7,369,398 B2 * | 5/2008 | Higashikozono et al. | 361/641 |
| 7,384,319 B2 * | 6/2008 | Kirstein et al. | 439/839 |
| 7,410,388 B2 * | 8/2008 | Lin | 439/501 |
| 7,438,587 B2 * | 10/2008 | Germani | 439/441 |
| 7,442,077 B2 * | 10/2008 | Peress et al. | 439/505 |
| 7,467,971 B2 * | 12/2008 | Lin et al. | 439/501 |
| 7,528,323 B2 * | 5/2009 | Wu et al. | 174/66 |
| 7,614,922 B1 * | 11/2009 | Buse | 439/787 |
| 7,695,312 B2 * | 4/2010 | Steele et al. | 439/501 |
| 7,722,384 B2 * | 5/2010 | Breen, IV | 439/441 |
| 7,794,268 B2 * | 9/2010 | Breen et al. | 439/441 |
| 7,880,098 B2 * | 2/2011 | Grimberg et al. | 174/547 |
| 7,914,298 B2 * | 3/2011 | Lauermann et al. | 439/76.1 |
| 7,938,661 B2 * | 5/2011 | Good et al. | 439/271 |
| 7,972,177 B2 * | 7/2011 | Richter | 439/620.26 |
| 8,003,885 B2 * | 8/2011 | Richter et al. | 174/50 |
| 8,075,326 B2 * | 12/2011 | Quiter et al. | 439/224 |
| 8,083,540 B1 * | 12/2011 | Spicer et al. | 439/460 |
| 8,097,818 B2 * | 1/2012 | Gerull et al. | 174/564 |
| 8,113,853 B2 * | 2/2012 | Coyle et al. | 439/76.1 |
| 8,128,439 B2 * | 3/2012 | Feldmeier et al. | 439/709 |
| 8,197,263 B2 * | 6/2012 | Rueggen et al. | 439/76.1 |
| 8,222,533 B2 * | 7/2012 | Gherardini et al. | 174/260 |
| 8,226,437 B2 * | 7/2012 | Quiter et al. | 439/604 |
| 8,262,405 B1 * | 9/2012 | Bishop | 439/439 |
| 8,308,504 B2 * | 11/2012 | Ackermann et al. | 439/496 |
| 8,330,035 B2 * | 12/2012 | Hattori | 136/244 |
| 2001/0024905 A1 * | 9/2001 | Kato et al. | 439/528 |
| 2003/0193322 A1 * | 10/2003 | Higashikozono et al. | 323/299 |
| 2005/0032416 A1 * | 2/2005 | Peress et al. | 439/502 |
| 2005/0042915 A1 * | 2/2005 | Hsiao | 439/528 |
| 2005/0054219 A1 * | 3/2005 | Werner et al. | 439/76.1 |
| 2005/0054244 A1 * | 3/2005 | Werner et al. | 439/682 |
| 2006/0025009 A1 * | 2/2006 | Wu | 439/528 |
| 2007/0026728 A1 * | 2/2007 | Mak | 439/505 |
| 2008/0190477 A1 * | 8/2008 | Hattori | 136/246 |
| 2008/0236886 A1 * | 10/2008 | Gerull et al. | 174/535 |
| 2009/0084570 A1 * | 4/2009 | Gherardini et al. | 174/51 |
| 2009/0215326 A1 * | 8/2009 | Breen et al. | 439/787 |
| 2009/0272559 A1 * | 11/2009 | Richter et al. | 174/59 |
| 2009/0275231 A1 * | 11/2009 | Richter | 439/535 |
| 2010/0105238 A1 * | 4/2010 | Good | 439/357 |
| 2010/0105245 A1 * | 4/2010 | Good et al. | 439/571 |
| 2010/0216336 A1 * | 8/2010 | Quiter et al. | 439/567 |
| 2010/0218797 A1 * | 9/2010 | Coyle et al. | 136/243 |
| 2010/0218802 A1 * | 9/2010 | Quiter | 136/244 |
| 2010/0279518 A1 * | 11/2010 | Watanabe et al. | 439/40 |
| 2010/0294528 A1 * | 11/2010 | Sella et al. | 174/50.5 |
| 2010/0319952 A1 * | 12/2010 | Lin et al. | 174/59 |
| 2011/0058337 A1 * | 3/2011 | Han et al. | 361/717 |
| 2011/0073157 A1 * | 3/2011 | Suzuki | 136/244 |
| 2011/0092094 A1 * | 4/2011 | Rueggen et al. | 439/620.21 |
| 2011/0104925 A1 * | 5/2011 | Quiter et al. | 439/271 |
| 2011/0136395 A1 * | 6/2011 | Yamazaki | 439/709 |
| 2011/0168228 A1 * | 7/2011 | McGreevy et al. | 136/244 |
| 2011/0195585 A1 * | 8/2011 | Feldmeier et al. | 439/110 |
| 2011/0198120 A1 * | 8/2011 | Richter et al. | 174/548 |
| 2011/0215759 A1 * | 9/2011 | Lee et al. | 320/115 |
| 2011/0230085 A1 * | 9/2011 | Castagnola et al. | 439/528 |
| 2011/0240088 A1 * | 10/2011 | Ecob | 136/244 |
| 2011/0290303 A1 * | 12/2011 | Weldon et al. | 136/251 |
| 2011/0294363 A1 * | 12/2011 | Yeh | 439/709 |
| 2012/0000689 A1 * | 1/2012 | Shu et al. | 174/59 |
| 2012/0043106 A1 * | 2/2012 | Richter et al. | 174/53 |
| 2012/0043986 A1 * | 2/2012 | Richter et al. | 324/756.01 |
| 2012/0045937 A1 * | 2/2012 | Richter et al. | 439/620.21 |
| 2012/0048614 A1 * | 3/2012 | Xue et al. | 174/520 |
| 2012/0048615 A1 * | 3/2012 | Masumoto | 174/547 |
| 2012/0052719 A1 * | 3/2012 | Xue et al. | 439/485 |
| 2012/0067613 A1 * | 3/2012 | Yu et al. | 174/59 |
| 2012/0069505 A1 * | 3/2012 | Chou et al. | 361/679.01 |
| 2012/0071024 A1 * | 3/2012 | Yu et al. | 439/540.1 |
| 2012/0075825 A1 * | 3/2012 | Yamazaki | 361/809 |
| 2012/0085565 A1 * | 4/2012 | Kleiss et al. | 174/50 |
| 2012/0100731 A1 * | 4/2012 | Umemoto et al. | 439/86 |
| 2012/0202374 A1 * | 8/2012 | Stracke | 439/502 |
| 2012/0205149 A1 * | 8/2012 | Lenel | 174/547 |
| 2012/0264328 A1 * | 10/2012 | Wu | 439/502 |

OTHER PUBLICATIONS

PCT International Preliminary Report on Patentability, International Application No. PCT/EP2011/053069, dated Sep. 4, 2012, 5 pages.

* cited by examiner

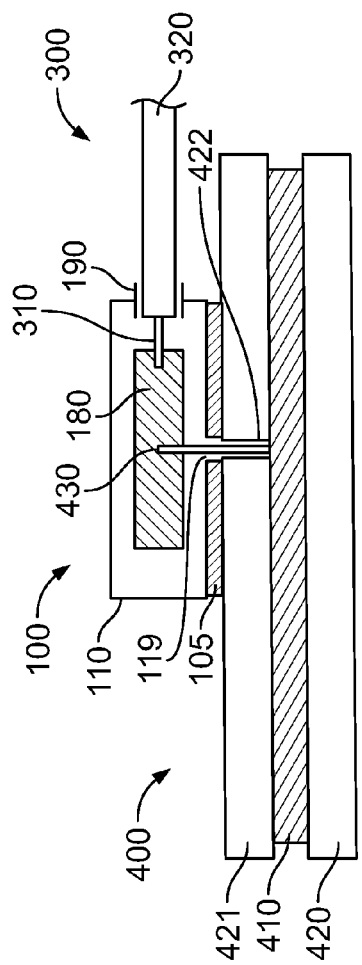
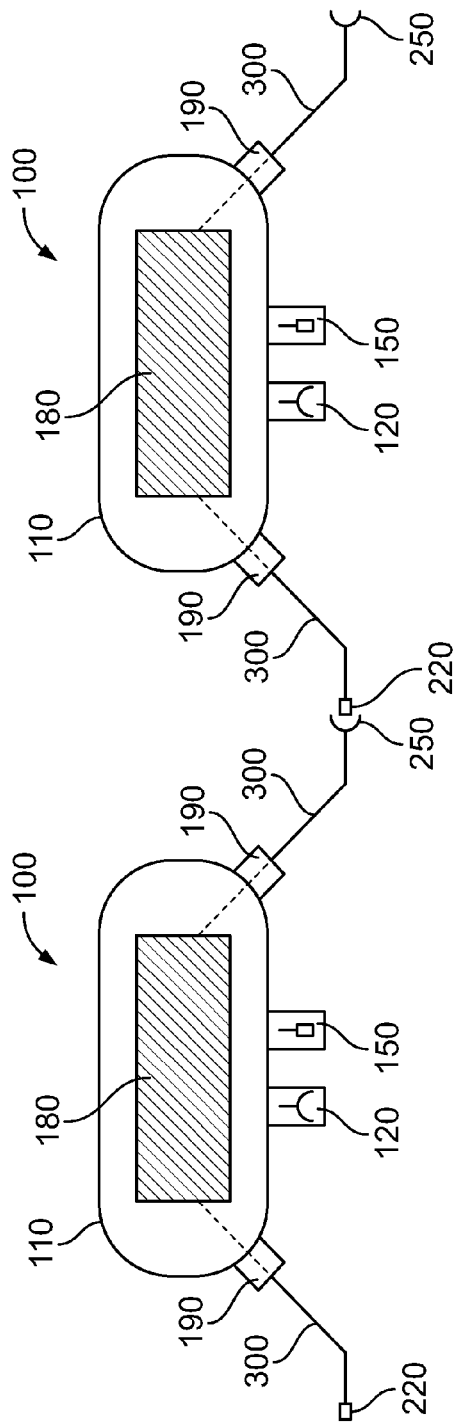
Fig. 1
Fig. 2

CONNECTION DEVICE FOR A SOLAR MODULE

CROSS-REFERENCE TO RELATED APPLICATIONS

This application is a continuation of PCT International Application No.: PCT/EP2011/053069 filed Mar. 2, 2011, which claims priority under 35 U.S.C. §119 to German Application No.: 10 2010 002 565.8, filed Mar. 4, 2010.

FIELD OF THE INVENTION

The present invention relates to a connection device for a solar module, which device has a housing and a contacting means, arranged in the housing, for contacting a contact element of the solar module. The invention furthermore relates to a solar module with such a connection device.

BACKGROUND

A photovoltaic solar module, also referred to as a solar panel, typically comprises a plurality of solar cells which convert radiant energy (as a rule sunlight) into electrical energy. The solar cells are arranged next to one another between a layer on the front side which faces the radiation and a layer on the rear side, and are electrically interconnected within this sandwich structure. The two layers are for example panes of glass. The sandwich structure may further be surrounded by a frame.

On the rear side of a solar module there is usually provided a connection device or connection box, which is used to connect contact elements of the solar module coming from the solar cells, for example connection foils or connection strips which are brought out on the rear side, to lines or cables. A plurality of connection devices and hence solar modules can be connected together via the cables. For example, serial interconnection of solar modules is conventional in order to achieve the generation of higher voltages. Furthermore, solar modules may be connected via the cables to devices such as for example an inverter.

In a conventional configuration, a connection device, which is also referred to as a connection box or solar box, comprises a housing with through openings for passing the contact elements of a solar module through, and a contacting means arranged within the housing for contacting the contact elements. The contacting means comprises for example conductor bars which are connected to clamps, which bars can be connected to the contact elements of the solar module, and to which the above cables or their conductors can also be connected. In this case, the cables may be fastened to the housing in the region of a cable end, for example by a cable gland provided on the housing. At the opposite end of the cable, the cables are usually provided with a plug-and-socket connector, which permits simple connection of cables of different connection devices (for example for serial interconnection) or attachment of cables to an inverter.

One disadvantage of the known connection devices is that the cables which are fastened to the connection devices by one cable end can be held on or fixed to the connection devices only inadequately or not securely. One current practice is for example temporarily to fix the cables to the housings of the connection devices for storage or transport with the aid of cable ties, fastening clips or by using adhesive tape. This is linked to problems such as for example dangling of the cables, and possibly damage thereto during transport. The temporary fixing of the cables furthermore makes it difficult to mount a connection device on a solar module and to carry out a final electrical inspection on a solar module, in which the solar module in question is contacted via the cables of the connection device which is arranged on the solar module.

One further problem is that the plug-and-socket connectors which are arranged on the cable ends are open or freely accessible. This means that contact elements of the plug-and-socket connectors may be exposed to influences such as for example water and dirt, which means that a plug-in connection realised by means of a thus-"contaminated" plug-and-socket connector may be compromised.

SUMMARY

The object of the present invention is to provide an improved solution for a connection device for a solar module.

According to the invention, a connection device for a solar module is proposed. The connection device has a housing and a contacting means, arranged in the housing, for contacting a contact element of the solar module. The connection device is distinguished by a blind mating connector arranged on the housing without an electrical connection to the contacting means, onto which connector a plug-and-socket connector can be plugged.

According to the invention, furthermore a solar module with such a connection device is proposed.

The blind mating connector arranged on the housing makes it possible to fix a plug-and-socket connector, and hence a cable end of a cable provided with the plug-and-socket connector, detachably to the housing. In this manner, the cable, which is for example already fastened to the housing by the other end and is electrically connected to the contacting means, can be secured during transport and storage of the connection device, but also in connection with mounting of the connection device on a solar module. Furthermore, the plug-and-socket connector (or a contact element arranged in the plug-and-socket connector) can be protected from external influences such as for example water and dirt.

In an embodiment, the housing has a fastening means for fastening a cable. The fastening means comprises an opening for passing the cable through into the housing, by means of which the cable (or its conductor) can be connected electrically to the contacting means. Such a fastening means may be provided on the housing for example in the form of a cable gland.

In a further embodiment, the connection device has a cable which is electrically connected to the contacting means, with a plug-and-socket connector at one (free) cable end. The cable end in question can be fastened to the blind mating connector via the plug-and-socket connector. In this configuration, the other end of the cable may for example be fastened to the housing with the aid of the fastening means described above.

In addition to temporary fixing of a cable, the blind mating connector may also be used with regard to a functional test or final inspection of a solar module. Such a functional test may be carried out once the connection device has been attached to the solar module.

In this respect, according to a further embodiment provision is made for the blind mating connector to have a contact element which can be plugged with a complementary contact element of the plug-and-socket connector. An electrical connection (via the plug-and-socket connector, the cable, the contacting means, the contact element of the solar module) to the solar cell(s) of the solar module can be produced by contacting the contact element of the blind mating connector, which is for example in the form of a contact pin or in the form of a female contact, in order to carry out the functional test.

In a further embodiment, the blind mating connector has an access opening via which the contact element of the blind mating connector can be contacted even when the plug-and-socket connector is plugged onto the blind mating connector. This means that the contact element of the blind mating connector can be contacted in a simple manner in the context of a functional test, for example by bringing a test pin of a corresponding testing device up to the contact element through the access opening and pressing it against said element.

In a further embodiment, the contact element of the blind mating connector has a flat section in the region of the access opening. Such a configuration permits relatively secure contacting of the contact element of the blind mating connector.

In a further embodiment, the connection device has a first blind mating connector without an electrical connection to the contacting means, a second blind mating connector without an electrical connection to the contacting means, a first cable, which is electrically connected to the contacting means, with a first plug-and-socket connector at one cable end and a second cable, which is electrically connected to the contacting means, with a second plug-and-socket connector at one cable end. The end of the first cable can be fastened to the first blind mating connector via the first plug-and-socket connector. The end of the second cable can be fastened to the second blind mating connector via the second plug-and-socket connector. Furthermore, the first and second plug-and-socket connectors are formed to be able to be plugged together. In this configuration, the ends of the two cables can be securely "parked" with the corresponding plug-and-socket connectors on the associated blind mating connectors. Also a plurality of such connection devices may be connected together. One example is a series connection, wherein in each case a first and a second cable of different connection devices are plugged together via the corresponding plug-and-socket connectors.

In a further embodiment, the first blind mating connector has a first contact element and the second blind mating connector has a second contact element. Furthermore, the first and second blind mating connectors each have an access opening via which the first and second contact elements of the first and second blind mating connectors can be contacted even when a plug-and-socket connector is plugged onto the first or second blind mating connector respectively. The access openings of the first and second blind mating connectors are formed such that the first and second contact elements can be contacted in the same contacting direction. This means that a functional test, in which both contact elements of the two blind mating connectors are contacted, can be carried out simply and automatically.

BRIEF DESCRIPTION OF THE DRAWINGS

The invention will be explained in greater detail below with reference to the figures. Therein:

FIG. 1 is a diagrammatic lateral sectional view of a solar module and a connection device arranged on the solar module;

FIG. 2 is a diagrammatic top view of two connection devices of FIG. 1, which are connected in series;

DETAILED DESCRIPTION OF THE EMBODIMENTS

Figure 3:
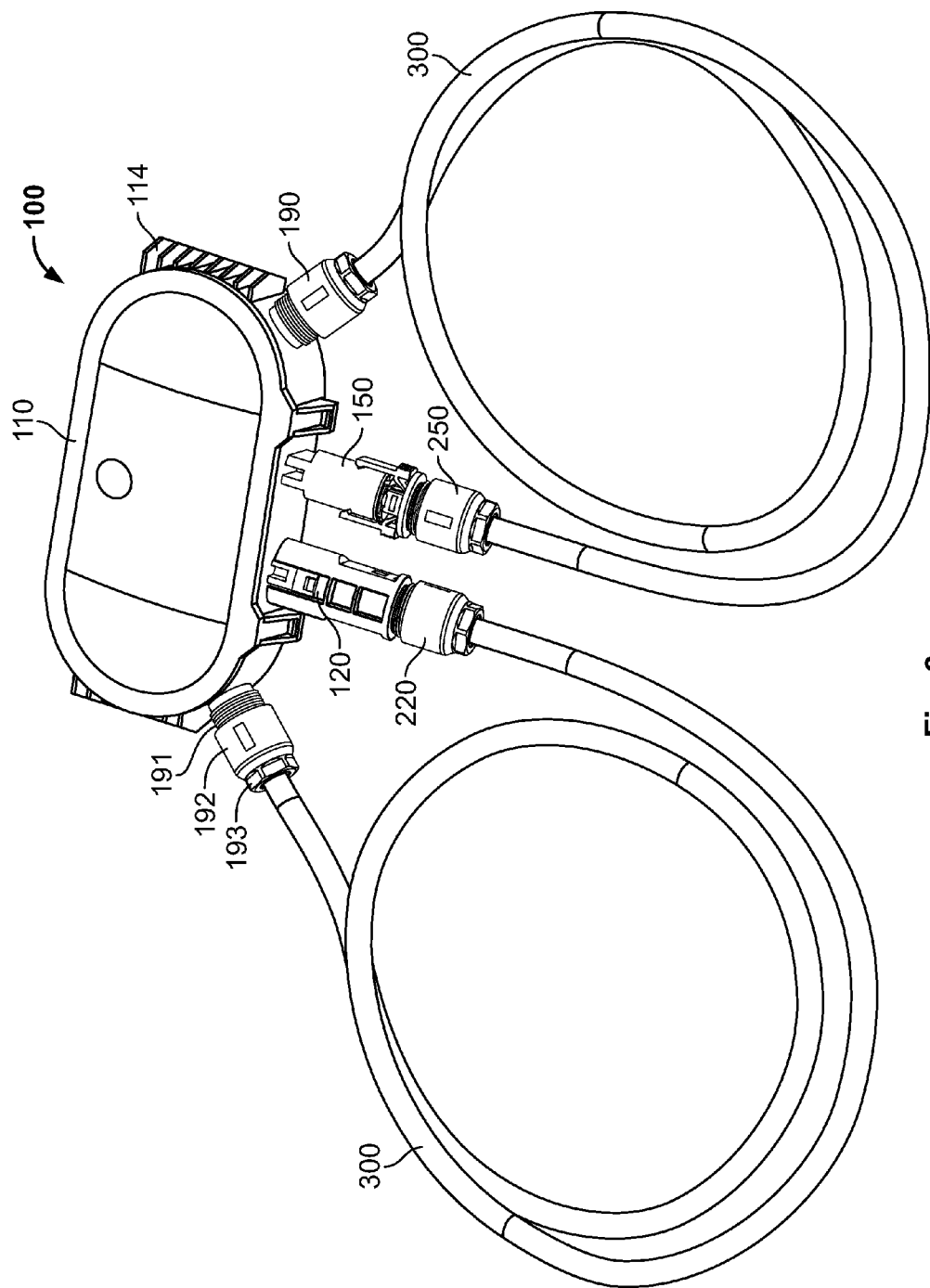
FIG. 3 is a perspective view of the connection device, in which cables provided with plug-and-socket connectors are connected to blind mating connectors of the connection device.

FIG. 1 shows a diagrammatic lateral sectional view of a photovoltaic solar module 400 which is provided with a connection device 100. The solar module 400 comprises a sandwich structure with a front (transparent) layer 420 on the radiation side and a layer 421 on the rear side, between which at least one solar cell 410 is arranged. The two layers 420, 421 may for example be panes of glass, or alternatively layers or sheets made of other materials (in particular plastics materials). In addition to these components, the solar module 400 may have further components (not shown), for example a (transparent) embedding layer or adhesive layer arranged between the layers (420, 421), in which layer the solar cell(s) 410 is/are embedded, and a profiled frame surrounding the sandwich structure.

A solar cell 410 is designed to generate electrical energy when irradiated with electromagnetic radiation, such as in particular sunlight. In order to tap off or discharge the energy (i.e. the voltage generated or the current generated) and to interconnect a plurality of solar cells 410, the solar module 400 has a conductor system which comprises contact elements 430 on the rear side of the solar module 400 or merges into contact elements 430 which are on the rear side. By way of example, an individual contact element 430 is illustrated in FIG. 1. Such a contact element 430 of the solar module 400, which is for example in the form of a connection foil or in the form of a connection strip, may for example be passed through a feed-through opening 422 in the layer 421 which is on the rear side and emerge on the or over the layer 421.

The connection device 100, which is also referred to as a connection box or solar box, is used to contact the contact elements 430 of the solar module 400 and further to connect them to corresponding cables 300 (of which only one cable 300 is illustrated in FIG. 1). The connection device 100 has a housing 110 which is made for example from a plastics material. The housing 110 surrounds an inner chamber and may, as illustrated in FIG. 1, be fastened for example with the aid of adhesive 105 to the rear side of the solar module 400 or to the layer 421 which is on the rear side. The housing 110 further has, on a side located opposite the layer 421 which is on the rear side, one or more housing openings 119 through which the contact elements 430 of the solar module 400 can be introduced into the inner chamber.

The connection device 100 comprises a means 180, arranged in the inner chamber of the housing 110, for contacting the contact elements 430 and connecting the same onwards, which means is referred to below as contacting means 180. The contacting means 180 may for example comprise a plurality of conductor bars which are for example provided with clamps or clamping means for connecting to the contact elements 430.

An electrical connection between the contact elements 430 and the contacting means 180 (or a component of the means 180) can be produced manually once the contact elements 430 have been introduced into the inner chamber of the housing 110. To this end, the housing 110 may for example have a housing base part with a housing opening which exposes the inner chamber, which base part is closed with a lid (not shown) after the contact elements 430 have been connected to the contacting means 180.

Alternatively, the contacting means 180 may be configured for "automatic" contacting of the contact elements 430. This means that contacting of a contact element 430 and fastening thereof to the contacting means 180 (or to a component of the means 180) takes place automatically upon introduction through the housing opening 119, without additional manual actuation being necessary. In this configuration, the housing 110 may also be formed without a lid (which is used for closing the inner chamber).

Furthermore, an electrical connection between contact elements 430 of the solar module 400 and associated cables 300 (in particular two cables 300, cf. FIG. 2) is produced via the contacting means 180. To this end, the connection device 100 may have a fastening means 190 for each of the cables 300 for fastening the cables 300 to the housing 110, a fastening means 190 having in each case an opening for passing a cable 300 through into the inner chamber to the contacting means 180 (cf. FIGS. 1 and 2). A fastening means 190 may be formed on the housing 110 in particular in the form of a cable gland.

A cable 300 has, as illustrated in FIG. 1, an electrical conductor 310, for example in the form of a stranded line, which is enveloped by an insulating cable sheath 320. In order to produce an electrical connection with the contacting means 180, the cable 300 in question may be stripped at one cable end, so that part of the conductor 310 is exposed, the cable 300 can be pushed through the opening in the fastening means 190 into the inner chamber, and the conductor 310 can be connected to the contacting means 180 (or to a component such as in particular a conductor bar of the means 180). The conductor 310 may for example be connected by means of screwing, soldering or welding. Subsequently, fastening or tight clamping of the cable sheath 320 can be carried out by means of the fastening means 190, by means of which the inner chamber can also be sealed off at this point at the same time. With regard to the above-mentioned cable gland, the cable sheath 320 can be securely clamped by mounting or screwing tight a clamping nut. Further details of a cable gland will be described in greater detail further below.

FIG. 2 shows two of the connection devices 100 of FIG. 1 in a diagrammatic top view, by means of which further details will become clear. Each of the connection devices 100 has two cables 300, of which in each case one end of the cables 300 is fastened via associated fastening means 190 to a housing 110 of the connection devices 100. The housing 110 has a form which in top view is substantially quadrilateral or rectangular with rounded-off "corners" or edges, the fastening means 190 being arranged on two of the rounded-off edges. These may, as indicated in FIG. 2, be angled outwards at an angle of approximately 45°.

At the cable ends which are not fastened to the housing 110, the cables 300 are further provided with plug-and-socket connectors 220, 250. As indicated in FIG. 2, these are in this case, per connection device 100, a "male" connector, also referred to below as a pin plug 220, and a "female" connector, also referred to below as socket plug 250. The connection devices 100, and as a result of this solar modules 400 which are contacted or contactable via the connection devices 100, can be connected to further devices such as in particular an inverter and, as illustrated in FIG. 2, can be connected together in series by means of the plug-and-socket connectors 220, 250 which are provided on the cable ends. The use of different plug-and-socket connectors 220, 250 allows the provision of reverse-polarity protection in order to connect connection devices 100 only in a predetermined polarity.

With regard to serial connection of solar modules 400 via the connection devices 100, provision is further made to associate protective or bypass diodes with the individual solar modules 400, by means of which diodes the current flow through the series connection can be ensured even if one of the solar modules 400 is not supplied with sufficient radiation or is shaded. Such diodes may be arranged on or in the region of the contacting means 180 of the connection devices 100 (for example between the above-mentioned conductor bars).

Furthermore, each connection device 100 has on one side of the housing 110 between the fastening means 190 two blind mating connectors 120, 150 which do not have an electrical connection to the contacting means 180. In this case, the blind mating connector 120 is in the form of a "female" connector or plug, onto which the pin plug 220 provided on one end of a cable 300 can be plugged. The blind mating connector 150 on the other hand is in the form of a "male" connector or plug, onto which the socket plug 250 provided at one cable end can be plugged.

Due to the configuration of a connection device 100 with the blind mating connectors 120, 150, there is the possibility of temporarily fastening or "parking" the cable 300 which is provided with the plug-and-socket connectors 220, 250 or the cable ends thereof to/on the blind mating connectors 120, 150. Such parking is illustrated by way of example in the perspective illustration of a connection device 100 in FIG. 3. In this case, a cable 300 (depending on the cable length thereof) may be wound up in one (or alternatively several) coils.

The detachable fixing of the cables 300 which is effected via the blind mating connectors 120, 150 offers the possibility of securing the cables 300 during transport and storage of the connection device 100, but also in connection with mounting the connection device 100 on a solar module 400. The plug-and-socket connectors 220, 250 which are connected to the blind mating connectors 120, 150 or the contact elements 230, 260 which are arranged in the plug-and-socket connectors 220, 250 may also be protected from external influences such as for example water and dirt.

Furthermore, the blind mating connectors 120, 150 may be used to facilitate the carrying-out of a final inspection of a solar module 400 (after the attachment of the corresponding connection device 100). To this end, the blind mating connectors 120, 150 have integrated contact elements 130, 160 which are readily accessible from the outside at a defined position, which are not further connected electrically to the contacting means 180. This, and also further (possible) features of the blind mating connectors 120, 150 and the plug-and-socket connectors 220, 250, will be discussed in greater detail further below.

Further (possible) configurations of the connection device 100 will become clear with reference to FIG. 3. Thus the housing 110 may have, on two opposed sides, for example in each case a structure in the form of ribs 114 which are arranged parallel to each other. The ribs 114 can impart increased mechanical stability to the housing 110. Furthermore, the ribs 114 may also permit easier handling, for example upon mounting the connection device 100 on a solar module 400.

Figure 11:
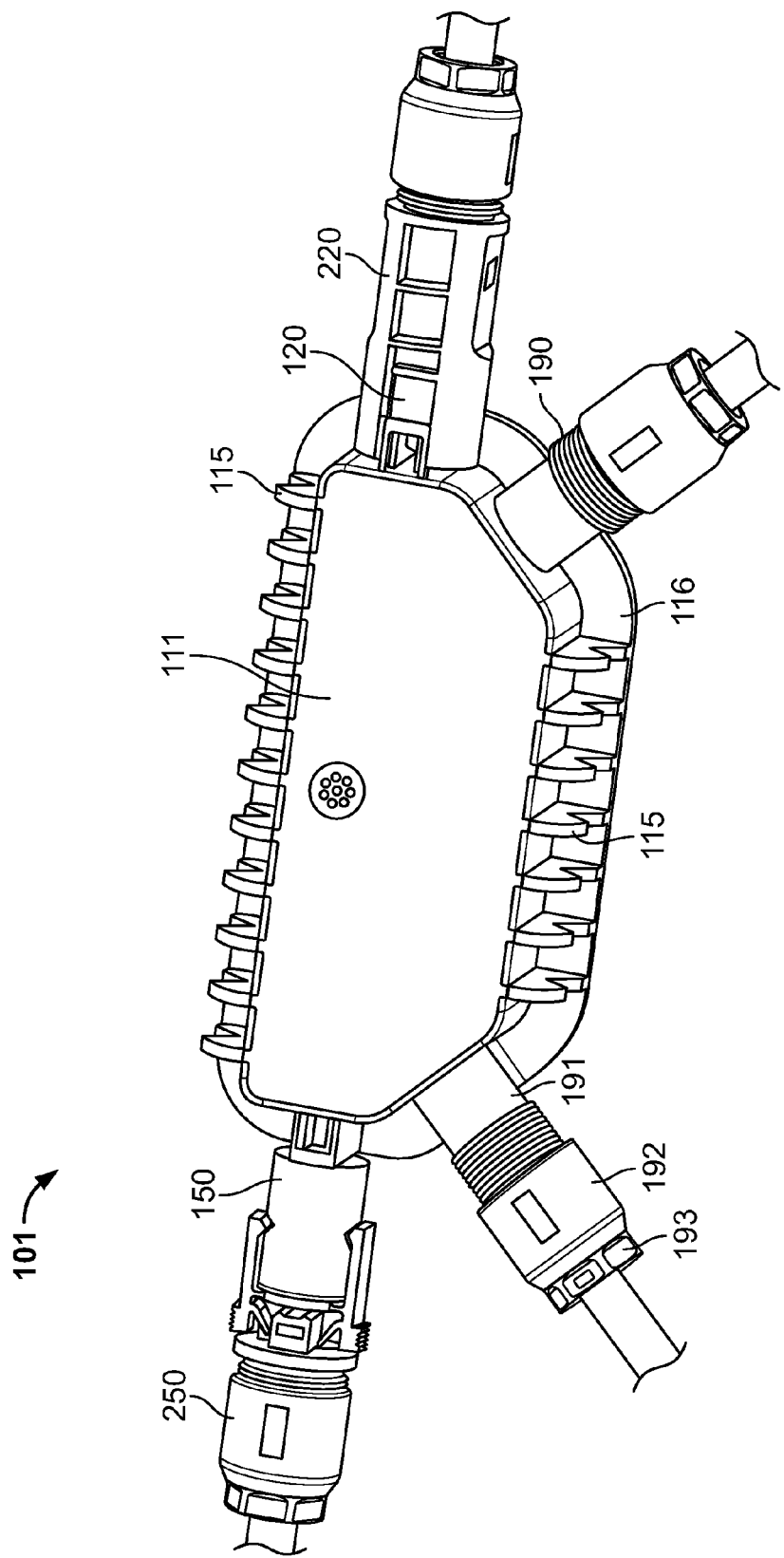
FIG. 11 is a perspective view of a further connection device.

FIG. 3 further shows the construction of the fastening means 190 in the form of cable glands (cf. also FIG. 11). A fastening means 190 has in each case a hollow-cylindrical or port-shaped section 191 with an external thread which is connected to the housing 110 (or injection-moulded thereto), and a hollow-cylindrical section 192 with an internal thread which can be screwed on to the section 191. The section 191 comprises the opening described above for passing a cable 300 through into the housing 110. The section 192, also referred to below as "clamping nut" 192, has on one edge an actuating region 193 for example in the form of a hexagon, in order to facilitate the screwing-on to the section 191 or to permit it by the use of a tool. Between the section 191 and the clamping nut 192 there is further arranged a sealing or clamping ring (not shown in FIG. 3), which is pressed inwards upon screwing the clamping nut 192 on the section 191, so that a cable sheath 320 of a cable 300 introduced into the section 191 can be clamped and the cable sheath 320 can consequently be fixed. This means that, further, the inner chamber of the housing 110 can be sealed off at this point. Further (possible) details of a cable gland will become apparent further below with reference to the plug-and-socket connectors 220, 250, which are likewise provided with (such a) cable gland.

Figure 4:
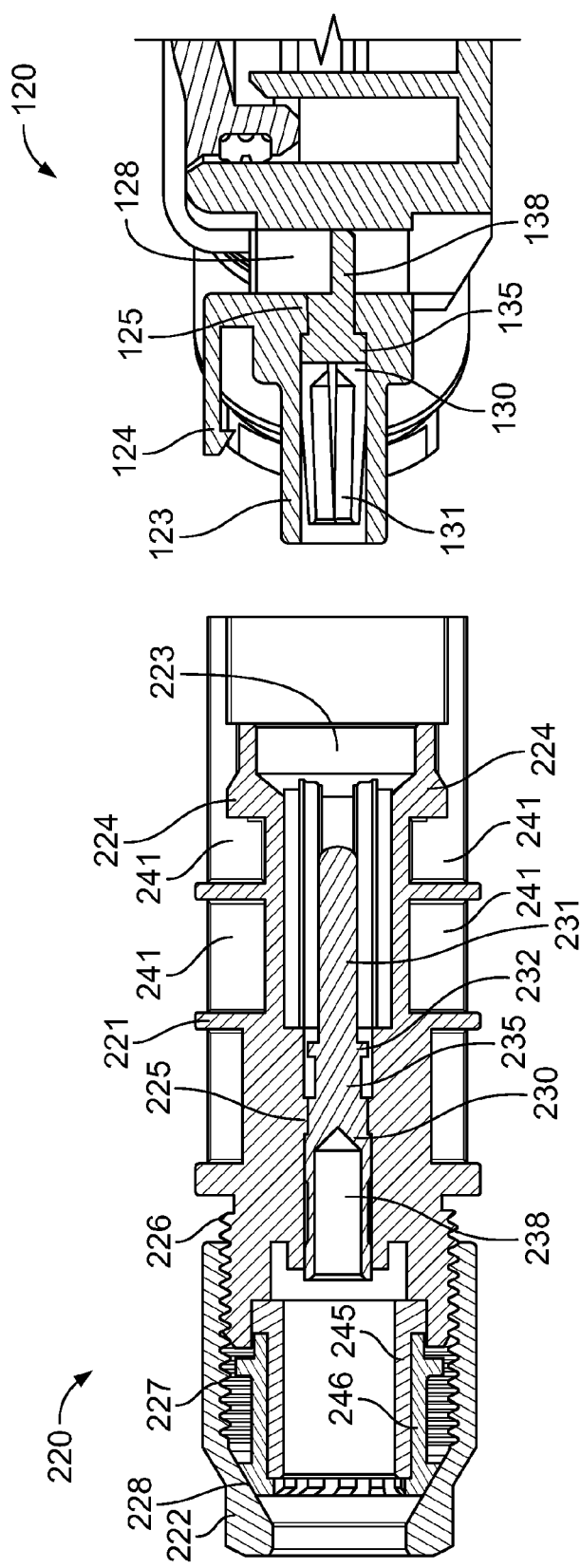
FIGS. 4 and 5 are different sectional views of one of the two blind mating connectors and of a pin plug of FIG. 3 in the non-plugged state.
Figure 5:
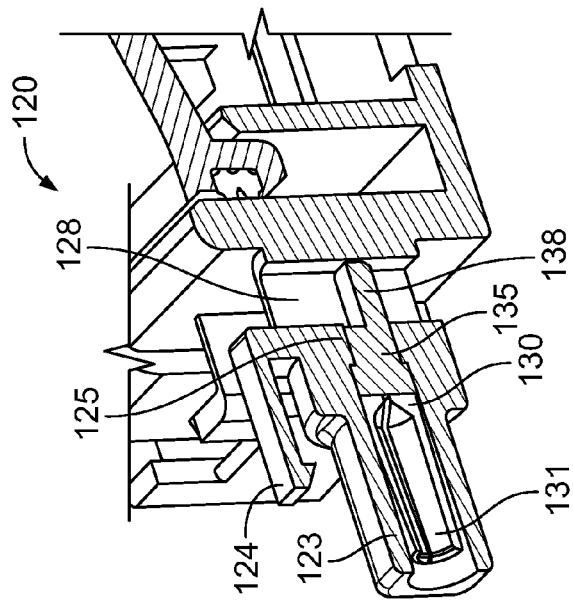
Figure 5:
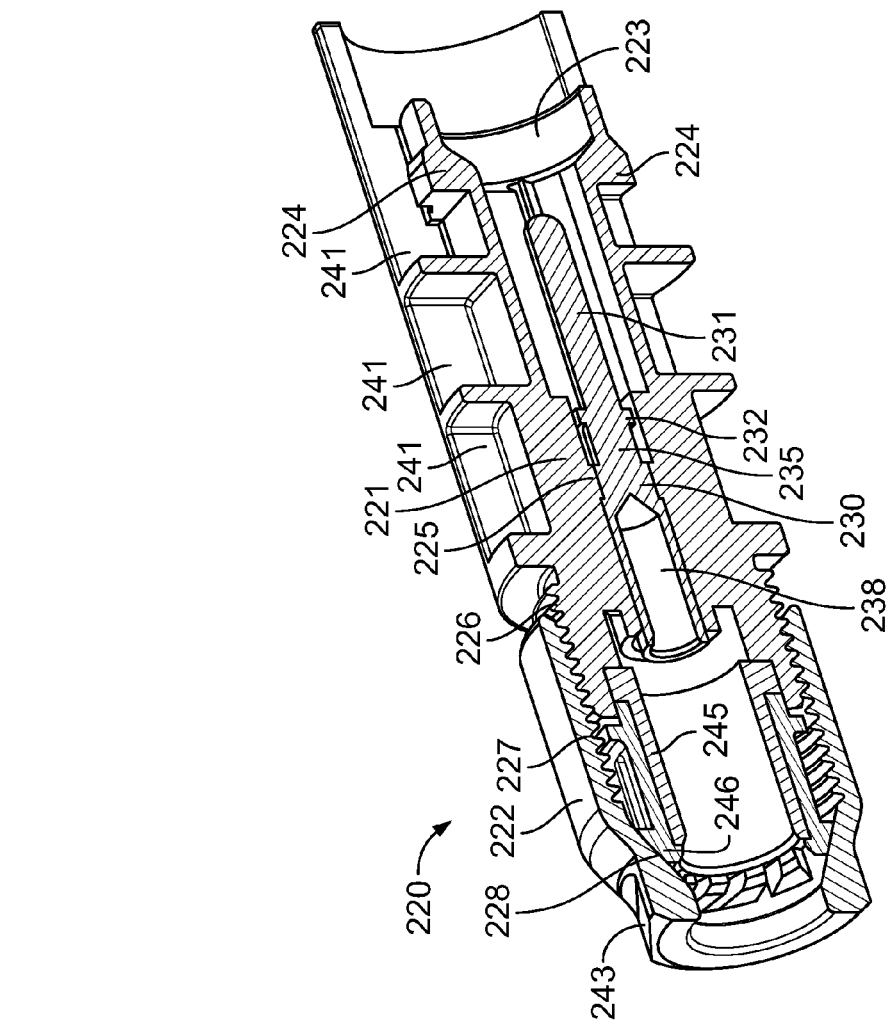
Figure 6:
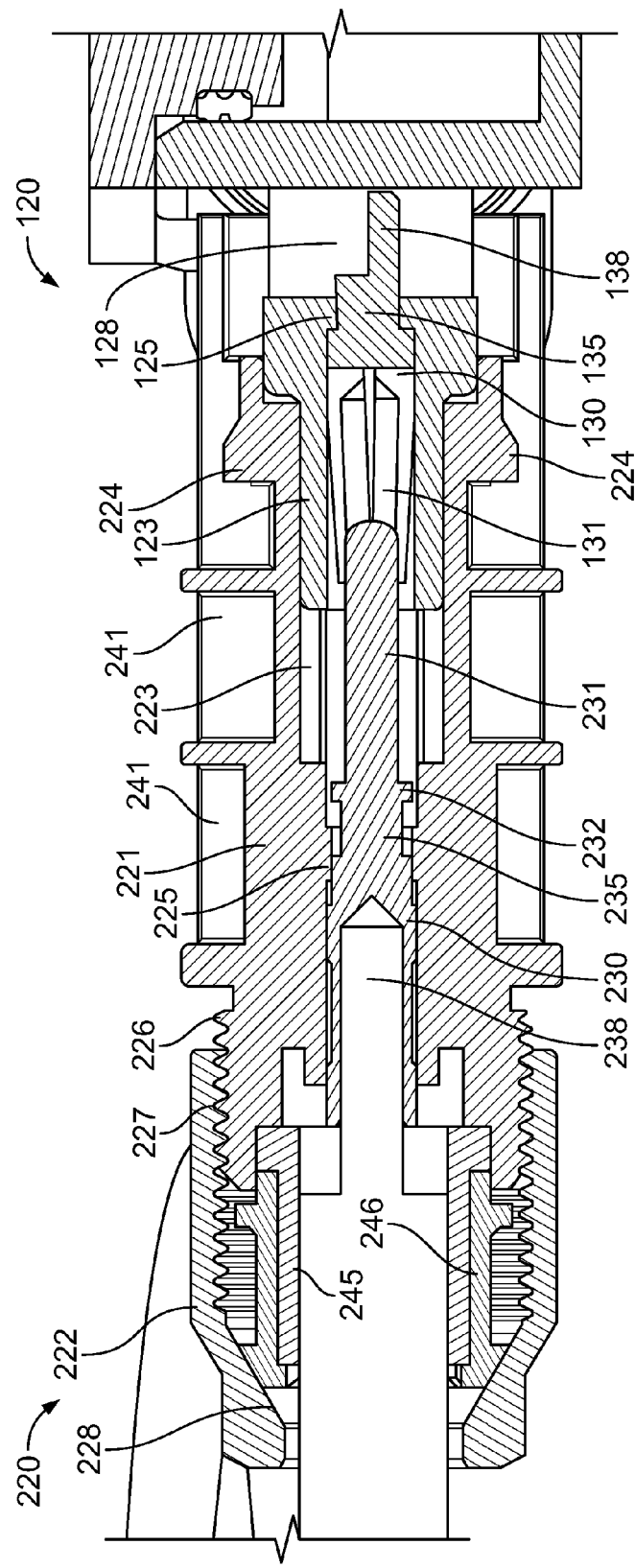
FIG. 6 is a view, corresponding to FIG. 4, of the blind mating connector and the pin plug in the plugged state.

FIGS. 4 and 5 show the "female" blind mating connector 120 and the pin plug 220 provided on one cable end (not shown) of FIG. 3 in a lateral and in a perspective sectional view, in each case in the non-plugged state. FIG. 6 shows a lateral sectional view of these two components 120, 220 in the fitted-together state.

The blind mating connector 120 comprises a housing part which is connected to the housing 110 or injection-moulded on to the housing 110, which part on the front side (i.e. on the left in FIGS. 4 to 6) has a substantially hollow-cylindrical or port-shaped section 123. Within the section 123, which will be referred to below as "receptacle" or "receiving section" 123, there is arranged a metallic contact element 130 of the blind mating connector 120. The contact element 130 in the present case is in the form of a female contact 130 with a substantially cylindrical configuration.

The female contact 130 has on the front side a receiving region 131 with a cutout into which a contact element 230 of the pin plug 220 can be inserted. Adjoining the receiving region 131, the female contact 130 further has a fastening region 135 with a (radially) circumambient edge or step which, when the female contact 130 is arranged on the blind mating connector 120, is surrounded or held by a correspondingly step-shaped holding region 125 of the blind mating connector 120. At one rear end, the female contact 130 has a region 138 with a flat section which, when the female contact 130 is attached to the blind mating connector 120, is arranged in a cuboid cavity of the blind mating connector 120. The cavity, and hence the region 138 of the female contact 130, are exposed by an access opening 128 which is separate from the receptacle 123 (or from the opening thereof which is on the front side), which means that the female contact 130 in the context of a function test is readily accessible or can be contacted from the outside when the pin plug 220 is plugged onto the blind mating connector 120, as is described in greater detail further below. The receptacle 123 and the separate access opening 128 are oriented in different directions or orientations to each other.

In order to attach the female contact 130 to the blind mating connector 120, the female contact 130 is introduced into the receptacle 123 from outside and the fastening region 135 of the female contact 130 is pushed or pressed into the holding region 125 until the steps of the regions 125, 135 adjoin each other or act as a stop for the female contact 130. This "end position" of the female contact 130 within the blind mating connector 120 is illustrated in FIGS. 4 to 6.

The blind mating connector 120 is further, as illustrated in FIGS. 4 and 5, provided with a bar-shaped latch clip 124 extending substantially parallel to the receptacles 123, which clip has on the front side a latch projection or latch edge directed (downwards or) in the direction of the receptacle 123. The latch clip 124 serves to fix the pin plug 220 which can be connected to the blind mating connector 120 detachably to the blind mating connector 120.

The pin plug 220 comprises two substantially hollow-cylindrical plug parts 221, 222. The two plug parts 221, 222, which are formed from a plastics material, are further in the form of a cable gland with threaded sections 226, 227 which correspond to each other, the plug part 221 acting as a base part 221 with an external thread 226, and the plug part 222 serving as a clamping nut 222 with an internal thread 227.

Within the base part 221, a metallic contact element in the form of a contact pin 230 is arranged in a corresponding cutout. The contact pin 230 has on the front side (i.e. on the right in FIGS. 4 to 6) a pin region 231 which can be inserted into the receiving region 131 of the female contact 130 of the blind mating connector 120, which means that the two contact elements 130, 230 can be contacted with each other. The pin region 231 of the contact pin 230 is provided within an opening or opening structure 223 which extends from an end, on the front side, of the base part 221 towards the back/inside, which opening or structure is matched to the shape of the receptacle 123 of the blind mating connector 120.

At a rear end, the contact pin 230 has a crimping region 238 with a cutout, with the aid of which a conductor 310 of a cable 300 can be connected to the contact pin 230 (not shown). Between the pin region 231 and the crimping region 238, the contact pin 230 further has a further region 235, referred to below as spring-ring region 235, on which a spring ring (not shown) which is provided for fastening the contact pin 230 on/in the base part 221 can be arranged. The spring-ring region 235 is limited by two (radially) circumambient edges or steps, the edge located closer to the pin region 231 being part of a (radially or circularly) circumambient raised section 232.

Upon the mounting of the pin plug 220 on a cable 300, first of all the cable end in question is stripped, with a part of the cable sheath 320 being removed and part of the conductor 310 being exposed. The exposed conductor 310 is further fastened by crimping to the crimping region 238 of the contact pin 230. For this, the conductor 310 is introduced into the cutout in the crimping region 238, and the contact pin 230 is compressed or deformed in the crimping region 238 with the aid of crimping pliers, which fixes the conductor 310 at/in the crimping region 238. Subsequently, the contact pin 230 which is connected to the conductor 310 and hence to the cable end in question, is introduced into the base part 221 at an opening on the rear side which is at the opposite end to the opening 223. In this case, the clamping nut 222 may already be screwed (somewhat) on to the base part 221.

The base part 221 has, on the cutout which receives the contact pin 230, an inward-directed (radially) circumambient raised section 225, past which the spring ring (not shown) which is provided on the contact pin 230 on the spring-ring region 235 is moved in a compressed state upon insertion of the contact pin 230. As soon as the raised section 225 is passed, the spring ring can expand or widen again, which latches or locks the contact pin 230 on the base part 221.

Between the base part 221 and the clamping nut 222 there is furthermore arranged a clamping ring which is constructed from an outer clamping-ring part 246 made of a rigid material (for example a plastics material) and an inner clamping-ring part 245 made of an elastic material (for example a rubber material). When the contact pin 230 is latched on the base part 221, part of the cable sheath 320 at the appropriate end of the cable 300 is surrounded by the clamping ring or the inner clamping-ring part 245. The clamping nut 222 has on the inside a bevel 258 against which the clamping-ring part 246 lies with a (thickened) end section. (Further) screwing of the clamping nut 222 on the base part 221 therefore results in the clamping ring, and consequently the clamping-ring part 245, being pushed increasingly inwards, which clamps the cable sheath 320 of the cable 300 at this point and consequently fixes it. This brings about not only fixing or pull relief for the cable 300, but at the same time also sealing (on the rear side) of the pin plug 220 at this point. In order to facilitate the screwing-on of the clamping nut 222, the clamping nut 222 has at one edge an actuating region 243, for example in the form of a hexagon (cf. FIG. 10).

The cable 300 which is provided with the pin plug 220 at one end can be temporarily parked by connecting it to the blind mating connector 120. In such case, the pin plug 220 is pushed on to the blind mating connector 120 such that the receptacle 123 of the blind mating connector 120, as illustrated in FIG. 6, is arranged within the opening 223, on the front side, in the pin plug 220. In this state, at the same time the pin region 231 of the contact pin 230 is inserted into the receiving region 131 of the female contact 130, and consequently an electrical connection between the contact pin 230 of the pin plug 220 and the female contact 130 of the blind mating connector 120 is brought about.

Figure 10:
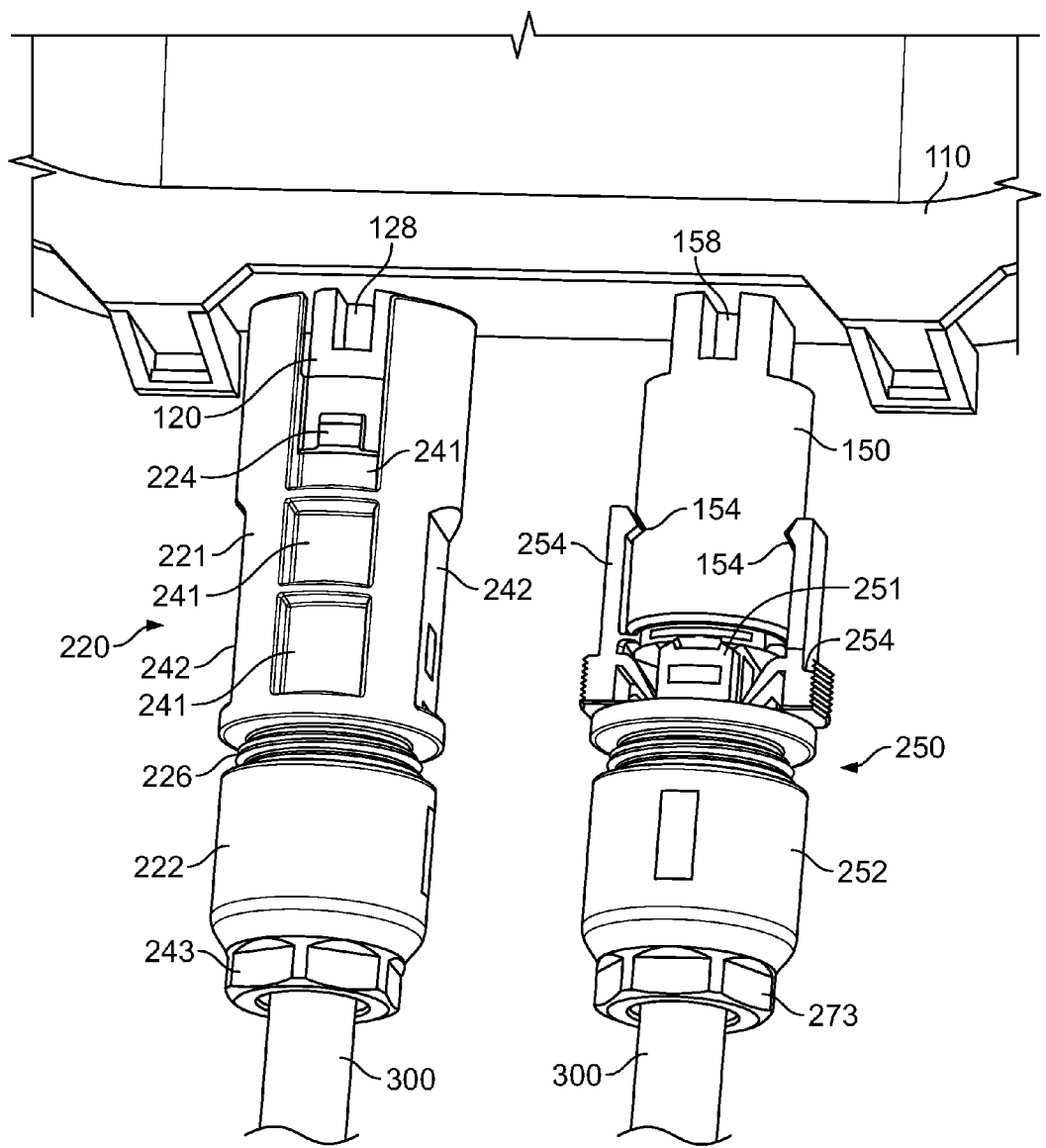
FIG. 10 is an enlarged section of the blind mating connectors and the plug-and-socket connectors of FIG. 3.

In order to facilitate the handling and the (manual) connecting of the pin plug 220 to the blind mating connector 120 (but also to, for example, a socket plug 250 of a cable 300 of another connection device 100), the base part 221 of the pin plug 220 further has cutouts 241 on the upper side and lower side (cf. FIGS. 4 to 6) and two lateral flat grip sections 242 (cf. FIG. 10). Furthermore, in each case a structure in the form of a latch edge 224 is formed in the front one of the cutouts 241 on the upper side and lower side. When the pin plug 220 is plugged onto the blind mating connector 120, one of the latch edges 224 is (detachably) surrounded or engaged by the latch clip 124 (illustrated in FIGS. 4 and 5) of the blind mating connector 120, which secures the pin plug 220 against unintentional detachment from the blind mating connector 120. Correspondingly, both latch edges 224 may be surrounded by latch clips 254 of a socket plug 250 (cf. FIG. 10), in order to secure a connection between the pin plug and socket plug 220, 250 of different connection devices 100. For the respective detachment of the fastening, the latch clip 124 of the blind mating connector 120 or the latch clips 254 of a socket plug 250 can be raised or actuated in order to break the engagement with the latch edge(s) 224.

Figure 7:
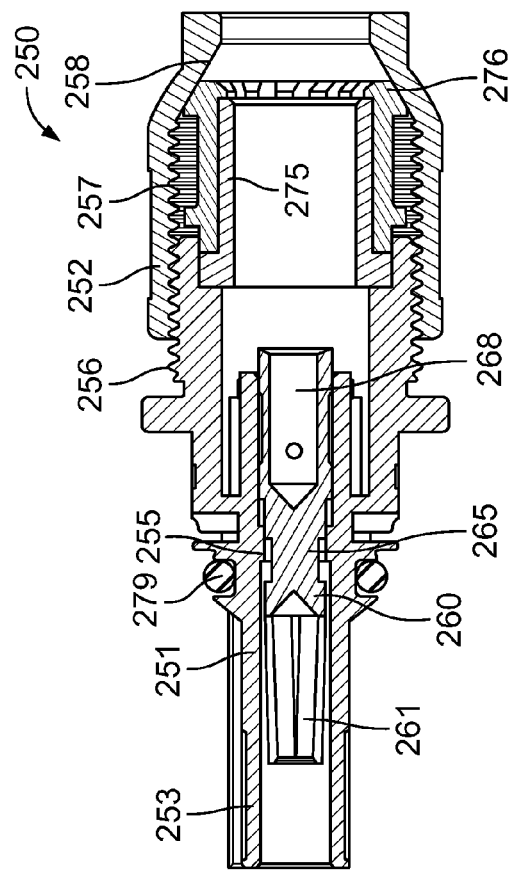
FIGS. 7 and 8 are different sectional views of the other one of the two blind mating connectors and of a socket plug of FIG. 3 in the non-plugged state.
Figure 7:
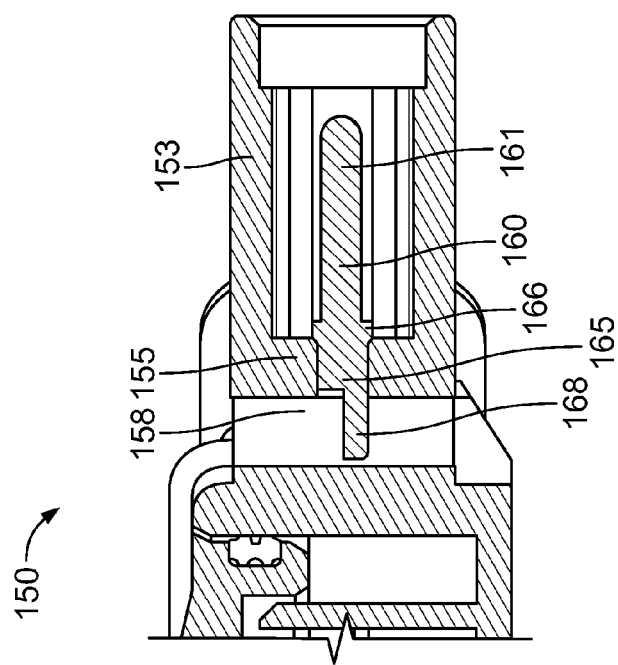
Figure 8:
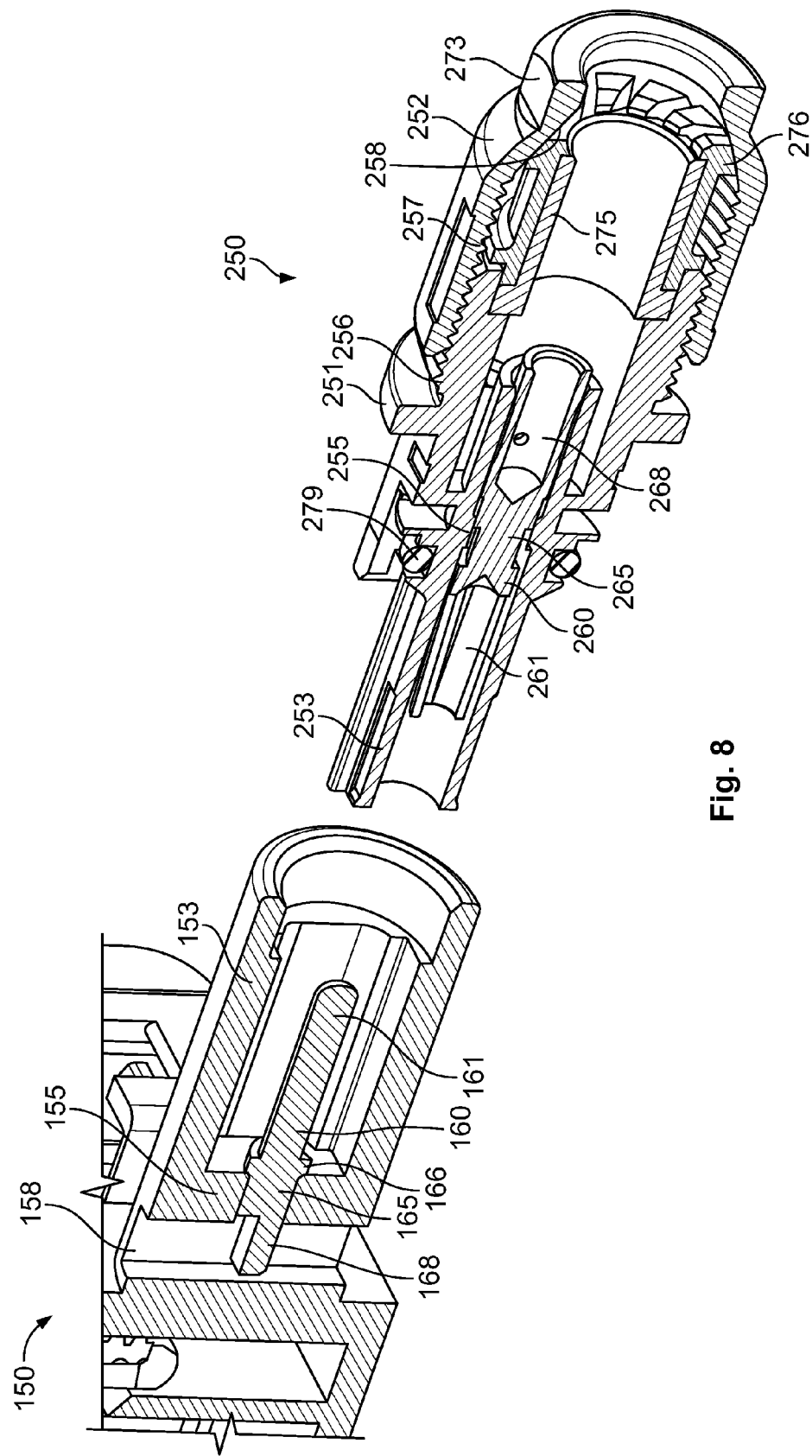
Figure 9:
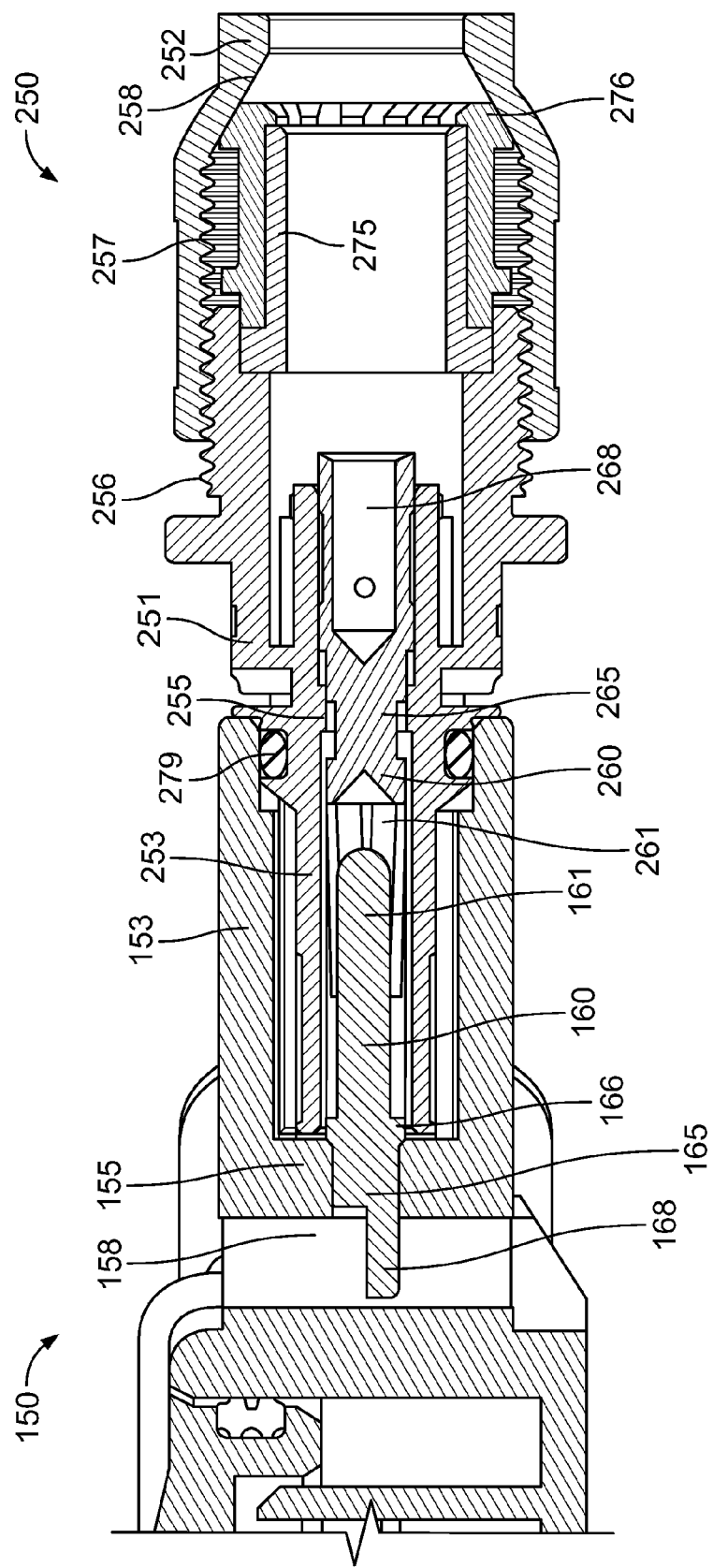
FIG. 9 is a view, corresponding to FIG. 7, of the blind mating connector and the socket plug in the plugged state.

FIGS. 7 and 8 show the "male" blind mating connector 150 and the socket plug 250 provided on one cable end (not shown) of FIG. 3 in a lateral and in a perspective sectional view, in each case in the non-plugged state. FIG. 9 shows a lateral sectional view of these two components 150, 250 in the fitted-together state.

The blind mating connector 150 has a housing part which is connected to the housing 110 or injection-moulded on to the housing 110, which part, on the front side (i.e. on the right in FIGS. 7 to 9), is in the form of a substantially hollow-cylindrical or port-shaped section 153, referred to below as receptacle or receiving section 153. The receptacle 153 comprises an opening which is matched to the shape of the socket plug 250, and within which a metallic contact element 160 of the blind mating connector 150 is arranged. The contact element 160 is in the form of a contact pin 160 with a substantially cylindrical configuration.

The contact pin 160 has on the front side a pin-shaped region 161 which can be inserted into a contact element 260 of the socket plug 250. Adjoining the pin region 161, the contact pin 160 further has a (radially) circumambient raised section 166 and a fastening region 165. When the contact pin 160 is arranged on the blind mating connector 150, the fastening region 165 is encompassed by a holding region 155 of the blind mating connector 150.

At a rear end, the contact pin 160 has a region 168 with a flat section which, when the contact pin 160 is attached to the blind mating connector 150, is arranged in a cuboid cavity of the blind mating connector 150. The cavity, and consequently the region 168 of the contact pin 160, are exposed by an access opening 158 which is separate from the receptacle 153 (or from the opening thereof which is on the front side), which means that the contact pin 160 in the context of a function test is accessible or can be contacted when the socket plug 250 is plugged onto the blind mating connector 150, as is described in greater detail further below. The receptacle 153 and the separate access opening 158 are oriented in different directions or orientations to each other.

In order to attach the contact pin 160 to the blind mating connector 150, the contact pin 160 is introduced into the receptacle 153 from outside and the fastening region 165 of the contact pin 160 is pushed or pressed into the holding region 155 until the raised section 166 adjoins a corresponding inner wall region of the receptacle 153 and acts as a stop for the contact pin 160. This "end position" of the contact pin 160 within the blind mating connector 150 is illustrated in FIGS. 7 to 9.

The socket plug 250 which can be connected to the blind mating connector 150 comprises two substantially hollow-cylindrical plug parts 251, 252. The two plug parts 251, 252, which are formed from a plastics material, are further in the form of a cable gland with threaded sections 256, 257 which correspond to each other, the plug part 251 acting as a base part 251 with an external thread 256, and the plug part 252 serving as a clamping nut 252 with an internal thread 257.

Within the base part 251, a metallic contact element in the form of a female contact 260 is arranged in a corresponding cutout. The female contact 260 has on the front side (i.e. on the left in FIGS. 7 to 9) a receiving region or socket region 261 into which the pin region 161 of the contact pin 160 of the blind mating connector 150 can be inserted, by means of which the two contact elements 160, 260 can be contacted together. The socket region 261 of the female contact 260 is provided within an insertion region 253, on the front side, of the base part 251, which part is matched to the shape of the receptacle 153 of the blind mating connector 150 (or to the shape of the cutout surrounded by the receptacle 153).

At a rear end, the female contact 260 has a crimping region 268 with a cutout, with the aid of which a conductor 310 of a cable 300 (as with the contact pin 230 described above) can be connected by crimping to the female contact 260 (not shown). Between the socket region 261 and the crimping region 268, the female contact 260 also has a spring-ring region 265, on which a spring ring (not shown) which is provided for fastening the female contact 260 on/in the base part 251 can be arranged. The spring-ring region 265 in the case of the female contact 260 is formed by a (radially) circumambient groove.

The mounting of the socket plug 250 on one end of a cable 300 is carried out comparably to the pin plug 220 described above. In this case, the conductor 310 of the cable 300 which is exposed at the stripped cable end is fastened to the crimping region 268 of the female contact 260 by crimping. Subsequently, the female contact 260 which is connected to the cable end is inserted into the base part 251 at an opening, on the rear side, at the opposite end to the insertion region 253, it being possible for the clamping nut 252 to already be screwed (somewhat) on to the base part 251. The base part 251 has, on the cutout which receives the female contact 260, an inward-directed (radially) circumambient raised section 255, past which the spring ring (not shown) which is provided on the spring-ring region 265 of the female contact 260 is moved in a compressed state upon insertion of the female contact 260. As soon as the raised section 255 is passed, the spring ring can expand or widen again, which fixes the female contact 260 to the base part 251.

Corresponding to the pin plug 220 described above, a clamping ring is arranged between the base part 251 and the clamping nut 252 also in the case of the socket plug 250, which ring is constructed from an outer clamping-ring part 276 which is made from a rigid material (for example a plastics material) and an inner clamping-ring part 275 made from an elastic material (for example a rubber material). When the female contact 260 is inserted into the base part 251, part of the cable sheath 320 of the cable 300 in question is surrounded by the clamping ring or the inner clamping-ring part 275. The clamping nut 252 has on the inside a bevel 258 against which the clamping-ring part 276 lies with a (thickened) end section. (Further) screwing of the clamping nut 252 on the base part 251 therefore results in the clamping ring, and consequently the clamping-ring part 275, being pushed increasingly inwards, which clamps and fixes the cable sheath 320 at this point. This at the same time also effects sealing (on the rear side) of the socket plug 250 at this point. In order to facilitate the screwing-on, the clamping nut 252 has on one edge an actuating region 273 for example in the form of a hexagon (cf. FIG. 10).

The cable 300 which is provided with the socket plug 250 at one cable end can be temporarily parked by connecting to the blind mating connector 150. In such case, the socket plug 250 is plugged onto the blind mating connector 150 such that the insertion region 253 of the socket plug 250, as illustrated in FIG. 9, is arranged within the receptacle 153 of the blind mating connector 150. In such case, at the same time the pin region 161 of the contact pin 160 is inserted into the socket region 261 of the female contact 260, and consequently an electrical connection between the female contact 260 of the socket plug 250 and the contact pin 160 of the blind mating connector 150 is brought about.

In order to achieve better fixing between the socket plug 250 and the blind mating connector 150, the blind mating connector 150, as illustrated in FIG. 10, has on the outside two grooves or latch notches 154 in which latch projections of latch clips 254 which are formed on two sides on the socket plug 250 can engage. The latch clips 254 have, at the opposite ends to the latch projections, actuating regions provided with notches or grooves, which regions can be actuated for pivoting the latch clips 254 and breaking the engagement.

With regard to a connection between the pin plug and socket plug 220, 250 of different connection devices 100 (for example corresponding to the serial interconnection illustrated in FIG. 2), in which the base part 251 of the socket plug 250 is introduced with the insertion region 253 into the opening 223 of the base part 221 of the pin plug 220, and the contact pin 230 is inserted into the female contact 260, the latch clips 254 of the socket plug 250, as described above, surround corresponding latch edges 224 of the pin plug 220. For additional sealing of such a connection, the socket plug 250 is further, as illustrated in FIGS. 7 to 9, provided with a seal in the form of an O-ring 279, which is held in a corresponding (radially circumambient) groove-shaped structure formed on the outside on the insertion region 253 of the socket plug 250.

The blind mating connectors 120, 150 of the connection device 100 may, in addition to temporary fastening of cable ends via the plug-and-socket connectors 220, 250, also be used for a functional test or final inspection of a solar module 400 when the connection device 100 is arranged on the solar module 400. Such a function test, in which the mode of operation of solar cells 410 of the solar module 400 can be checked, may consist of exposing the solar module 400 to a specified irradiation, for example in the form of a light pulse, and measuring the current or voltage generation of the solar module 400 via the connection device 100. In this case, the plug-and-socket connectors 220, 250 provided on the cables 300, as illustrated in FIG. 10, are connected to the blind mating connectors 120, 150. By contacting the contact elements 130, 160 of the blind mating connectors 120, 150, an electrical connection can be brought about, via the contact elements 230, 260 of the plug-and-socket connectors 220, 250, the cables 300 or their conductors 310, the contacting means 180 and the contact elements 430 connected thereto, to the solar cell(s) 410 of the solar module 400, in order to detect the generation of current or voltage.

In order to contact the contact elements 130, 160 of the blind mating connectors 120, 150 which serve as test points, corresponding test contacts or test pins of a corresponding testing device (not shown) may be brought up against the contact elements 130, 160, or their regions 138, 168 which are provided with flat sections, through the access openings 128, 158 in the blind mating connectors 120, 150 and may be pressed against them. The configuration of the regions 138, 168 with flat sections in this case permits relatively secure contacting thereof.

The function test or the contacting of the contact elements 130, 160 of the blind mating connectors 120, 150 may furthermore be facilitated in that the blind mating connectors 120, 150 for each connection device 100 are arranged in a predetermined position and at a specified distance from each other. In particular, provision may be made for the access openings 128, 158 or their (rectangular) edge contours, as illustrated in FIG. 10, to lie substantially in one plane, which means that the contact elements 130, 160 of the blind mating connectors 120, 150 can be contacted in the same contacting direction. This provides the possibility of carrying out the functional test automatically with a testing device.

In addition to the connection device 100 explained with reference to FIGS. 1 to 10, further connection devices with blind mating connectors can be realised which are described below. With regard to details already described which relate to similar or matching components, method steps for assembly which can be used, possible advantages etc., reference is made to the above statements.

FIG. 11 shows an alternative configuration of a connection device 101 which has substantially the same components as the connection device 100. Unlike the connection device 100, the connection device 101 has a housing 111 with a somewhat modified form, in which the blind mating connectors 120, 150 further are provided on the outside of the fastening means 190. The housing 111 is furthermore surrounded on the outside by a two-dimensional edge region 116, and has on two sides ribs 115 with notches which are connected to the edge region 116 and an outer wall of the housing. The ribs 115 may bring about greater stability of the housing 111, and further promote simple handling of the housing 111 due to the notches.

Figure 12:
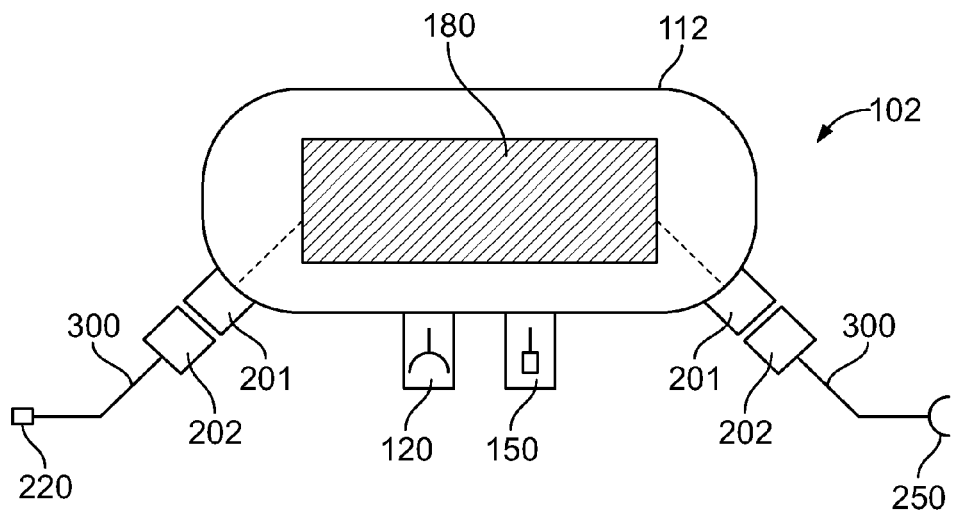
FIGS. 12 and 13 are diagrammatic views of further connection devices.

FIG. 12 shows a further connection device 102 in a diagrammatic top view, which has a housing 112 with a contacting means 180 arranged in the housing 112 and two blind mating connectors 120, 150 arranged on the housing 112 without a connection to the contacting means 180. Ends of cables 300 which are provided with plug-and-socket connectors 220, 250 can be temporarily fixed to the blind mating connectors 120, 150. Unlike the connection devices 100, 101, no fastening means or cable gland 190 for the cables 300 is provided in the connection device 102. Instead of this, two plugs or plug-and-socket connectors 201 are formed on the housing 112, the contact elements of which plugs or connectors are connected to the contacting means 180. Correspondingly, cable ends of the cables 300 which are provided on the connection device 102 are provided with plug-and-socket connectors 202 which are matched to the plug-and-socket connectors 201 or have corresponding contact elements. The cables 300 (or their conductors 310) may therefore be connected electrically to the contacting means 180 by plugging the plug-and-socket connectors 202 onto the plug-and-socket connectors 201.

The plug-and-socket connectors 201, 202 may be in the form of socket plugs and pin plugs which can be plugged together, and may for example have a construction corresponding or comparable to the plug-and-socket connectors 220, 250 described above. Also, the plug-and-socket connectors 201 provided on the housing 112 may be formed differently with regard to reverse-polarity protection, for example in that one of the plug-and-socket connectors 201 is in the form of a pin plug and the other of the plug-and-socket connectors 201 is in the form of a socket plug.

Figure 13:
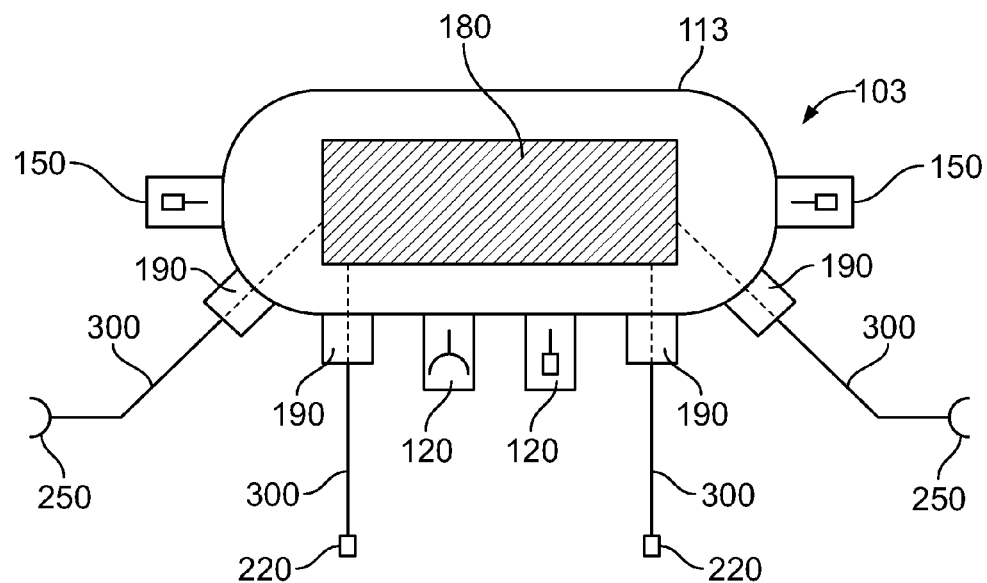

FIG. 13 shows a further connection device 103 in a diagrammatic top view, in which, unlike in the connection devices 100, 101, 102, four cables 300 are provided. Such a configuration may for example be considered in the case of a parallel connection of connection devices. The connection device 103 illustrated has a housing 113 with four fastening means 190 and four blind mating connectors 120, 150, the "female" blind mating connectors 120 being provided for example between, and the "male" blind mating connectors 150 for example on the outside of, the fastening means 190 on the housing 113. The cables 300 have corresponding plug-and-socket connectors 220, 250 on the cable ends which are not fastened to the fastening means 190.

The embodiments of connection devices and their components which have been explained with reference to the figures represent embodiments, or embodiments by way of example, of the invention. In addition to the embodiments which have been described and illustrated, further embodiments which may comprise further modifications or combinations of described features are conceivable.

Possible modifications may for example relate to differently configured housings or housing forms, blind mating connectors, plug-and-socket connectors, fastening means or cable glands, contact elements, latch elements and latch means etc., but also to different numbers of for example blind mating connectors on a housing. Also, blind mating connectors and cable glands or plug-and-socket connectors may be provided on a housing in a different orientation or geometry.

With regard to the connection device 103 of FIG. 13, there is the possibility of replacing fastening means 190 with plug-and-socket connectors (corresponding to FIG. 12).

One further possible modification relates to the contacting means 180 which is described. It is for example possible for the connection of contact elements 430 of a solar module 400 to the means 180 to take place differently than by the clamps described, for example by screwing, soldering or welding. This is in particular the case for a "manual" configuration of the contacting means 180.

Furthermore, it is conceivable to fasten a housing of a connection device to a solar module in a different manner than by gluing, for example by means of screws.

Furthermore, there is the possibility of providing blind mating connectors without integrated contact elements on connection devices. Such blind mating connectors may be used exclusively for parking cable ends via plugs or plug-and-socket connectors provided on the cable ends.

What is claimed is:

1. A connection device for a solar module, having:
    a housing;
    a contacting means arranged in the housing for contacting a contact element of the solar module; and
    a connector arranged on an outside surface of the housing without an electrical connection, having a pluggable mating end that is engageable with a pluggable mating end of a corresponding plug and socket connector.

2. A solar module with a connection device according to claim 1.

3. A connection device according to claim 1, the housing having a fastening means for fastening a cable, the fastening means comprising an opening for passing the cable through into the housing.

4. A connection device according to claim 3, further having a cable, which is electrically connected to the contacting means, with a plug-and-socket connector at one cable end, the cable end being able to be fastened to the connector via the plug-and-socket connector.

5. A connection device according to claim 4, the connector having a contact element which can be plugged with a complementary contact element of the plug-and-socket connector.

6. A connection device according to claim 5, the connector having an access opening via which the contact element of the connector that can be contacted even when the plug-and-socket connector is plugged onto the connector.

7. A connection device according to claim 6, the contact element of the connector having a flat section in the region of the access opening.

8. A connection device according to claim 7, having:
    a first connector without an electrical connection to the contacting means, a second connector without an electrical connection to the contacting means, a first cable, which is electrically connected to the contacting means, with a first plug-and-socket connector at one cable end, and a second cable, which is electrically connected to the contacting means, with a second plug-and-socket connector at one cable end, the end of the first cable being able to be fastened to the first connector via the first plug-and-socket connector, the end of the second cable being able to be fastened to the second connector via the second plug-and-socket connector, and the first and second plug-and-socket connectors being formed to be able to be plugged together.

9. A connection device according to claim 8, the first connector having a first contact element and the second connector having a second contact element, the first and second connectors each having an access opening via which the first and second contact elements of the first and second connectors can be contacted even when a plug-and-socket connector is plugged onto the first or second connector respectively, and the access openings of the first and second connectors being formed such that the first and second contact elements can be contacted in the same contacting direction.

10. A connection device according to one of claims 5 to 7, the contact element of the connector being one of the following components:
a contact pin, or a female contact.

11. A connection device for a solar module, having:
a housing having a cable fastening means with a cable receiving opening extending into the housing;
a contacting means arranged in the housing for contacting a contact element of the solar module;
a first connector detached from the contacting means and disposed on the housing, and having a first access opening exposing a first contact element with a first flat section positioned therein;
a second connector detached from the contacting means and disposed on the housing separate from the first connector, and having a second access opening exposing a second contact element with a second flat section positioned therein;
a first cable electrically connected to the contacting means and having a first plug-and-socket connector at one cable end and pluggable into the first connector using the first plug-and-socket connector to connect with the first contact element; and
a second cable electrically connected to the contacting means and having a second plug-and-socket connector at one cable end and to pluggable into the second connector using the second plug-and-socket connector to connect with the second contact element.

12. A connection device for a solar module, having:
a housing;
a contacting means arranged in the housing for contacting a contact element of the solar module; and
a first connector isolated from the contacting means and disposed on an outside surface of the housing, and having a first mating end;
a second connector isolated from the contacting means and disposed on the surface of the housing and separate from the first connector, and having a first mating end;
a first cable electrically connected to the contacting means and having a first plug-and-socket connector at one cable end and pluggable into the first mating end of the first connector using the first plug-and-socket connector; and
a second cable electrically connected to the contacting means and having a second plug-and-socket connector at one cable end and pluggable into the second mating end of the second connector using the second plug-and-socket connector.

13. The connection device according to claim 12, the first connector having a first contact element and the second connector having a second contact element, the first and second connectors each having an access opening via which the first and second contact elements of the first and second connectors can be contacted even when a plug-and-socket connector is plugged onto the first or second connector respectively, and the access openings of the first and second connectors being formed such that the first and second contact elements can be contacted in the same contacting direction.

14. A connection device for a solar module, comprising:
a housing positioned over a contacting element of the solar module;
a first contact positioned in an inner chamber of the housing and connected to the contacting element; and
a connector without an electrical connection disposed on an outside surface of the housing, and having a plug-and-socket mating end.

15. The connection device according to claim 14, wherein the connector includes a first plug-and-socket connector.

16. The connection device according to claim 14, further comprising a fastener disposed on the outside surface and separate from the connector and having an opening for passing into the inner chamber to the first contact.

17. The connection device according to claim 14, wherein the contact includes a conductor contacting the contacting element.

18. A connection device for a solar module, comprising:
a housing;
a contact arranged in the housing contacting a contact element of the solar module;
a connector arranged on an outside surface of the housing without an electrical connection to the contact, and having a plug-and-socket mating end; and
a cable extending through an opening in the housing and electrically connecting to the contact, and having a plug-and-socket connector at one cable end that is connectable to the plug-and-socket mating end of the connector.

19. The connection device according to claim 18, further comprising a fastener disposed on the outside surface of the housing and separate from the connector.

20. The connection device according to claim 19, wherein the fastener disposed around the opening for passing into the housing and to the contact.

21. The connection device according to claim 18, wherein the contact includes a conductor contacting the contacting element.

* * * * *